United States Patent [19]

Juntunen

[11] Patent Number: 5,039,010

[45] Date of Patent: Aug. 13, 1991

[54] RELAY-CONTROLLED ANTICIPATION IN A TWO SWITCH THERMOSTAT

[75] Inventor: Robert D. Juntunen, Golden Valley, Minn.

[73] Assignee: Honeywell Inc., Minneapolis, Minn.

[21] Appl. No.: 496,388

[22] Filed: Mar. 20, 1990

[51] Int. Cl.⁵ .................... F24F 7/00; C05D 15/00
[52] U.S. Cl. .................... 236/78 C; 236/68 B; 236/49.3
[58] Field of Search ............. 236/49.3, 78 C, 68 B

[56] References Cited

U.S. PATENT DOCUMENTS 2,382,073  8/1945  Lehane et al. .................... 236/68 B

FOREIGN PATENT DOCUMENTS 0143647  7/1986  Japan .................... 236/78 C

Primary Examiner—William E. Wayner
Attorney, Agent, or Firm—Edward Schwarz

[57] ABSTRACT

A conventional thermostat has separate high and low temperature switches for controlling a reversible motor driving a modulating damper or valve whose position controls the temperature of an enclosure by controlling the injection and removal of heat from the enclosure. In the improvement, relay contacts control the current flow to the thermostat's heat and cool anticipator resistors, and only relay control current flows through the motor windings. This avoids degraded motor performance resulting from anticipator resistor current flow through the motor windings and makes the anticipator resistor current level independent of the motor impedance. The relay chosen is one whose activating element draws very little current to close the relay contacts. The preferred embodiment uses a solid state relay which includes a light emitting diode whose light emissions control the impedance of a semiconductor circuit forming the "contacts" of the relay.

9 Claims, 2 Drawing Sheets

RELAY-CONTROLLED ANTICIPATION IN A TWO SWITCH THERMOSTAT

BACKGROUND OF THE INVENTION

Certain types of systems for controlling the air temperature within an enclosure employ a reversible AC motor which is under the control of a thermostat. The motor may position a damper which regulates flow of heating or cooling air into the enclosure or may position a valve which regulates the flow of heating or cooling water to a heat exchanger within the enclosure. Such motor control thermostats typically include two temperature responsive switches, one of which controls motor shaft rotation for opening the valve or damper and another controlling the closing of same. In the conventional embodiments, the switches are carried on the end of a bimetal strip which tilts in response to temperature changes, thereby changing the angular orientation of the switches. These switches open and close depending on their angular orientation, and in this way respond to temperature changes.

It is preferable in controlling the position of the motor shaft, to minimize the amount of movement of the shaft and damper or valve. This reduces operating time of the motor and damper or valve, reducing wear and lengthening the operating life of the devices.

To reduce operating time of the motor and to prevent overshoot of the temperature within the controlled enclosure, it is customary to use so-called anticipator resistors to apply heat to the bimetal strip. When the temperature falls below the lower control limit and the shaft is rotated so as to increase enclosure temperature, a measure of additional heat called anticipation heat is applied to the bimetal strip to cause the strip's ambient temperature to rise more rapidly than the enclosure temperature. Thus the increase in the influx of warmer air or the decrease in the influx of cooler air is reduced by the bimetal strip's early response to the anticipation heat. That is, the thermostat anticipates the warming of the enclosure by the anticipation heat applied to it and causes the switch whose closing causes the enclosure to warm, to open before the enclosure temperature rises above the upper temperature control limit. Similarly, when the enclosure temperature rises above the upper control limit, and cooling is applied to the enclosure, it is necessary to cool the bimetal strip more rapidly than the enclosure itself to prevent cooling the enclosure to below the lower control limit. Since it is inconvenient to actually cool the bimetal strip, instead the thermostat is designed to provide the bimetal strip when both the heating and cooling switches are open, with a level of anticipation heat which is lower than that applied when the heating switch is closed. When the enclosure temperature rises above the upper control limit and the switch controlling cooling closes, then this lower level of anticipation heat is removed from the bimetal strip, in effect applying "cooling" to it.

To apply anticipation heat as described with the anticipator resistors, it is the practice to draw the (lower level of) anticipation current flowing when both control switches are open, through the motor. It has been found for some of these motor designs that this relatively small current (typically 5-15 ma.) is nonetheless capable of causing the motor shaft position to slowly drift in response to any unbalanced torque on the shaft. This results in the need to reposition the motor shaft much more frequently than if such current were not constantly flowing through the winding. This current has also been found to reduce motor torque when driving the motor during the time that the heating switch is closed and the higher level of anticipation heat is required.

It is easiest to explain in greater detail these characteristics of such a conventional thermostatically controlled system with reference to FIG. 1. The motor 10 is shown as having a shaft 15 which is driven, typically through a gear drive not shown, in the clockwise (forward) direction as viewed in the drawing by alternating current applied to a field winding 11 and in the counter-clockwise (reverse) direction by current applied to a field winding 12 as the legends CW and CCW indicate. Shaft 15 is mechanically connected (the mechanical connection is symbolized by the dotted line) to a damper 16 within an air duct 17 so that forward rotation of shaft 15 causes the damper to rotate clockwise to a more open setting which is maximum when the damper 16 is parallel to the duct centerline, with reverse rotation of shaft 15 achieving the opposite effect. Cooling or heating air flow into the enclosure 18 supplied by a fan not shown is thus controlled by damper 16. Capacitor 13 is a conventional phase capacitor which couples the two windings 11 and 1 to each other to form the rotating magnetic field necessary to induce rotation of shaft 15. Power for motor 10 is supplied at terminals 36 and 37 and typically will be 24 volts AC supplied by the secondary of a transformer not shown.

An enclosure 18 is shown diagrammatically as having within it circuitry comprising a conventional thermostat 9 whose purpose is to control the position of damper 16 so as to regulate the temperature within enclosure 18 according to the occupants' wishes. Of course the reader understands that the typical enclosure 18 will be a room with a thermostat 9 which occupies a very small part of one of the walls defining the room. The implementation shown is for cooling a room with cooling air flowing in duct 17, but by merely reversing the thermostat connections to windings 11 and 12, the thermostat will operate in heating mode assuming heated air is available in the duct.

Power is switched to motor 10 by the thermostat's mercury level switches 19 and 29 carried on the arm 26 forming the outer end of a temperature sensitive element, typically a bimetal strip 24. As is well known, such bimetal strips tend to change the total angular amount they are coiled as the ambient temperature changes, and it will be assumed that the bimetal strip 24 tends to unwind (straighten) with decreasing temperature and wind more tightly with increasing temperature as viewed in FIG. 1. The effect of this is to cause the arm 26 of strip 24 to rotate clockwise with increasing temperature and rotate counterclockwise with decreasing temperature. The entire bimetal strip 24 along with switches 19 and 29, is carried on a shaft 28 which may be rotated by the room's occupant by a mechanism not shown to change the angular position of arm 26 for a particular temperature. It is usual to carry switches 19 and 29 on a frame, omitted for simplicity's sake here, which is attached to arm 26. Such a frame may be adjustable to change the amount of displacement of arm 26 between the angles at which switches 19 and 29 close. This difference in the closing angles for the switches sets the width of the control range in which no repositioning of the damper 16 is necessary. Electrical connections to these switches 19 and 29 are through flexible leads symbolized by the pigtails 27 which isolate arm 26 from any external torque which might affect its motion in response to temperature changes.

Each of the mercury switches 19 and 29 includes a glass or plastic capsule 20 or 30 having a small mercury ball or globule 21 or 31 within it and pairs of internal contacts 22 and 23 or 32 and 33. Contacts 22 and 23 control current flow to winding 11 and contacts 32 and 33 control current flow to winding 12. In the attitude shown in FIG. 1, neither switch 19 nor 29 is conducting. Cooling bimetal strip 24 to a first selectable temperature causes bimetal strip 24 to unwind slightly and mercury ball 31 to roll to the left to complete the connection between contacts 32 and 33 and close switch 29 If bimetal strip 24 then warms slightly, mercury ball 31 returns to its position at the right end of capsule 30 opening switch 29. If bimetal strip 24 warms to a second selectable temperature, mercury ball 21 rolls to its left and forms an electrical connection between contacts 22 and 23 thereby closing switch 19. Of course, subsequent cooling of bimetal strip 24 breaks the connection between contacts 22 and 23 and opens switch 19. The relative angular position of each of these capsules 20 and 30 with respect to each other as mounted on arm 26 and the frame is such as to have a temperature range of a few, perhaps 2, degrees (Fahrenheit) within which neither of the pairs of contacts 22, 23 and 32, 33 are connected to each other by their respective mercury balls 21 or 31. Contacts 22 and 23 are connected directly to forward winding 11 to form a first series motor circuit to control the flow of electrical power for driving motor 10 forward. Contacts 32 and 33 are connected directly to reverse winding 12 to form a second series motor circuit to control the flow of electrical power for driving motor 10 in reverse. The first and second selectable temperatures are dependent on the angular position of shaft 28 which is under the control of the enclosure's occupants.

For the implementation in FIG. 1 operating in the air conditioning mode assumed, increasing air flow in duct 17 cools enclosure 18. If temperature should rise within enclosure 18 to the second selectable temperature then, additional air flow into the enclosure is necessary to cool the enclosure. This requires motor shaft 15 to be driven in a forward or clockwise direction to open damper 16 an additional amount. The increasing temperature within enclosure 18 and adjacent bimetal strip 24 closes the circuit between contacts 22 and 23 which allows power to flow to winding 11 from terminals 36 and 37. Motor shaft 15 rotates clockwise to admit more cool air through duct 17 and the temperature within enclosure 18 and adjacent bimetal strip 24 begins to drop. When the enclosure temperature rises above the first selectable temperature, arm 26 then rotates counterclockwise slightly, the connection between contacts 22 and 23 is broken, and no further change in shaft 15 positioned is called for. No further change is then theoretically necessary in the position of damper 17 while the thermal load on enclosure 18 is unchanged.

Similarly, if temperature falls to the first selectable temperature within enclosure 18, bimetal strip 24 reacts to this condition by unwinding sufficiently to cause mercury ball 31 to connect contacts 32 and 33 causing current to flow through the reverse winding 12 of motor 10 and damper 16 to close. Temperature in enclosure 18 and adjacent bimetal strip 24 begins to rise in response to the reduced flow of cooling air, switch 29 opens, and no further change in the position of damper 16 is necessary for a time.

It has long been known that it is necessary to use anticipator resistors 25 and 35 to prevent overshoot of the temperature within the enclosure 18 from the first and second selectable temperatures defining the ends of the control band and sensed by the bimetal strip 24 and its associated switches 19 and 29. This overshoot occurs principally in these control systems because the damper position reaches the steady state position for maintaining the temperature within the control range much more quickly than the enclosure temperature reaches the control range. If the enclosure temperature was alone relied on to control conduction of the switches 19 and 29, the damper would be driven far beyond the proper steady state control position.

These anticipator resistors 25 and 35 are placed in juxtaposition with the bimetal strip 24 so that heat generated by current flow through them is applied to bimetal strip 24 and causes it to wind slightly more tightly than it otherwise would if the anticipation heat were not to be provided. Anticipation heat is provided by resistor 35 whenever the low temperature switch 29 is closed to rotate damper 16 to a more closed position and admit less cooling air to enclosure 18. For the high temperature switch 19, anticipation heat is provided to bimetal strip 24 at all times except when switch 19 is closed, shunting resistor 25 while driving damper 16 closed to admit less cooling air to enclosure 18. Note that anticipation heat is applied from both resistors 25 and 35 when switch 29 is closed, since switch 19 is always open when switch 29 is closed. It can thus be seen that three different levels of anticipation heat are provided to bimetal strip 24. When switch 29 is closed, the maximum amount of heat, from both resistors 25 and 35, is provided. When neither switch 19 nor 29 is closed, a lesser amount of heat from resistor 25 only is provided, and when switch 19 is closed, then no anticipation heat is provided.

The anticipation heat level provided when resistor 25 only is conducting tends to cause both switches 19 and 29 to close, for a given shaft setting, at a slightly lower temperature of the air within enclosure 18 than if this anticipation heat was not present. This poses no problem in practice, because the scale on the shaft 28 adjustment mechanism is factory calibrated to compensate for this effect. When temperature falls within enclosure 18 and switch 29 closes (driving damper 16 closed), the additional anticipator heat provided by resistor 35 causes additional heating of bimetal strip 24 and switch 29 to open at a lower temperature of enclosure 18. The value of resistor 35 is selected to cause switch 29 to open before the damper 16 has moved past its optimal position where the enclosure 18 temperature will be held within the control range without further damper movement. The removal of anticipation heat from resistor 25 when switch 19 is closed simulates cooling of bimetal strip 24 and in essence anticipates the cooling of enclosure 18 which arises from closing of switch 19. The value of resistor 25 must be selected so that its removal causes switch 19 to open before damper has moved past the optimal position described above. In both the heating and the cooling cases, the overall temperature within enclosure 18 is held by the presence or absence of the anticipation heat, accurately between the two selectable temperatures defining the control range.

As can be seen from the circuit of FIG. 1, current flow in resistor 25 flows also through winding 11 when switch 19 is open. For some types of loads such as damper 16, the torque loading on motor 10 with motor 10 unpowered may be unbalanced, for example because of gravity. In such cases for some types of motors 10, the anticipation current through resistor 25 and winding 11, even though small, is enough to cause shaft 15 and its load to slowly change position, changing the flow of cooling (or heating) air and causing the enclosure temperature to change. This means that actual closing of a switch to correct the temperature is necessary earlier than would otherwise be required. To reduce wear, a design will ideally cause motor shaft 15 to be rotated only in response to changes in heating or cooling loads on enclosure 18 which cause one or the other of switches 19 and 29 to close, rather than on changes in the shaft 15 position resulting from drift in its position.

Another disadvantage with the design of FIG. 1 is that for some applications there is no value for anticipator resistor 35 which adequately heats bimetal strip 24 to provide sufficient anticipation heat for accurate control when switch 29 is closed. This is because there is not enough voltage available from the 24 VAC control transformer to provide the series connection of resistor 35 and winding 12 with adequate heating of bimetal strip 24 and sufficient current flow through winding 12 for rated torque.

A further problem with this design is that the amount of anticipation heat generated by each of the resistors 25 and 35 is dependent on the number of motors 10 which are controlled by the thermostat 9 and also on the impedance of these motors. It is sometimes desirable to be able to control several motors with a single thermostat as this reduces the number of thermostats required. It is also desirable that the anticipation heat be independent of the characteristics of the particular motor or motors controlled by the thermostat. Because all of the current for anticipator resistors 25 and 35 flows through the windings of motor 10, obviously changing the number or type of motors controlled by the thermostat will change the amount of current flowing through the anticipator resistors 25 and 35 when switch 29 is closed, possibly necessitating a field alterable design for thermostat 9. This is because the amount of anticipation heat required by the thermostat cannot be arbitrarily changed without adversely affecting operation of the system. The additional complexity added by dependence of the anticipation heat on the motor load results in additional cost and creates the possibility that inexpert installation will result in degraded operation of the system.

All of these problems make a new approach to the design of this thermostat desirable.

BRIEF DESCRIPTION OF THE INVENTION

It is possible to improve such a conventional thermostat so that these disadvantages are no longer present. Such an improved thermostat is of the type to be placed in an enclosure for controlling the position of a reversible motor's shaft controlling in turn the temperature of the enclosure. The thermostat further is for connecting one of a forward drive coil and a reverse drive coil of the motor to a source of electric power in response to changes in the enclosure temperature. The conventional thermostat has a temperature responsive element including a first switch conducting when ambient temperature is below a first selectable temperature and is for series connection with the reverse drive coil of the motor to form with it a first series motor circuit. The temperature responsive element also includes a second switch conducting whenever the temperature is above a second selectable temperature higher than the first selectable temperature and which is for series connection with the forward drive coil of the motor to form with it a second series motor circuit. These series motor circuits are for connection across power terminals of the source of electric power. Such a thermostat further includes a first anticipator resistor connected to conduct current whenever the first switch is closed and positioned with respect to the temperature responsive element so that the heat generated by electric current passing through the first anticipator resistor is applied to the temperature responsive element. There is also a second anticipator resistor which is connected to conduct current whenever the second switch is open and which is positioned to apply heat when conducting to the temperature responsive element.

To avoid the disadvantages of the abovementioned conventional thermostat, this invention includes the addition of a switch condition sensor circuit which is connected to a contact of the second switch for providing a closure signal when the second switch is open. There is also a relay provided which has an activating element which receives the closure signal from the switch position sensing means and having a first and a second pair of normally open contacts. Each of these relay contact pairs close when the closure signal is applied to the activating element in response to the second switch's open condition. The first pair of relay contacts is in series connection with the first anticipator resistor to form a first series anticipator circuit for connection directly across the reverse motor winding. The second pair of contacts is in series connection with the second anticipator resistor to form a second series anticipator circuit for direct connection across the power source. The relay should be of the type pulling in and holding at a substantially lower current than the first anticipator resistor draws to avoid the problem caused when the anticipator current passes through the forward motor winding. Solid state types of relay now available fulfill this requirement.

It can thus be seen that both pairs of relay contacts are closed whenever the second switch is open. The first series anticipator circuit provides a path for anticipation current for the first anticipator resistor which is parallel to the reverse motor winding rather through this winding. The second series anticipator circuit provides a path for anticipation current for the second anticipator resistor which is directly across the power supply terminals rather than through the forward motor winding.

Accordingly, one object of this invention is to prevent anticipator resistor current flow through the motor windings.

A second object of this invention is to provide adequate anticipation current without affecting motor performance.

A further object of this invention is to prevent unnecessary motor operation and consequent wear.

Another object is to prevent anticipator resistor current from opposing drive current applied to the motor windings.

Yet another object is to prevent motor shaft rotation other than when a thermostat contact has closed and shaft rotation is demanded.

Another object is to make the thermostats employing this invention relatively insensitive to a varying number of control motors without adjustment of the thermostat.

A last object is to accomplish these objects without substantially increasing the physical size of the thermostat unit.

Other objects and purposes of this invention will become apparent from the description of the invention which follows.

DESCRIPTION OF THE PREFERRED EMBODIMENT

Figure 1:
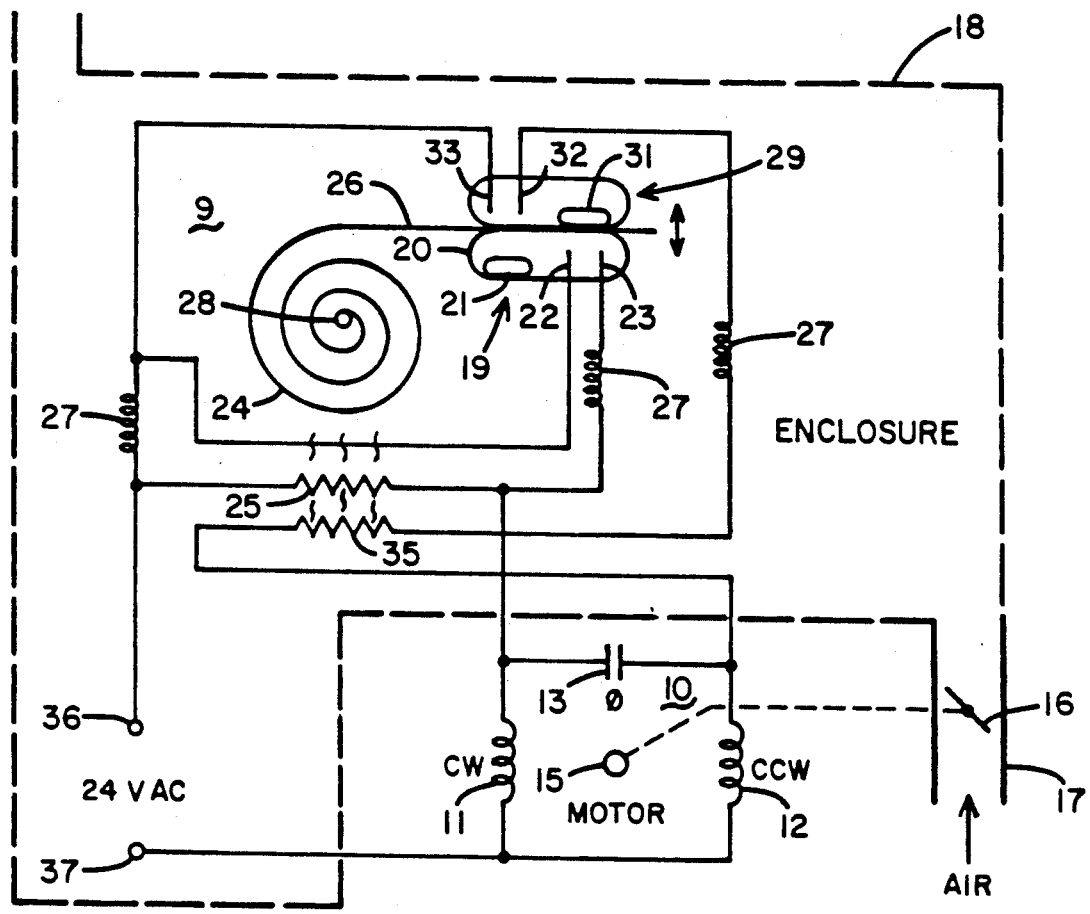
FIG. 1, already discussed, is a combined circuit schematic and sketch of the mechanical elements of the present thermostat structure.
Figure 2:
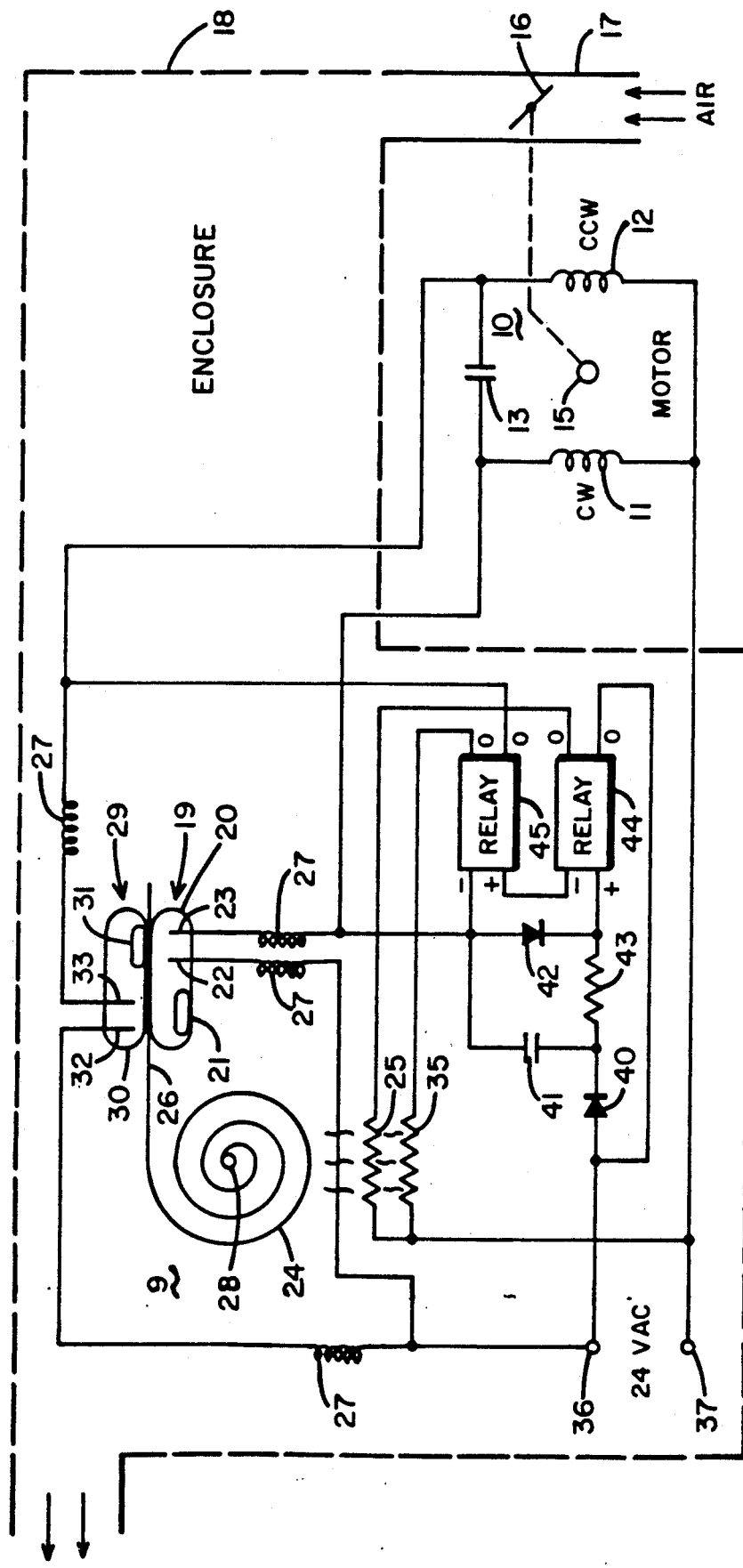
FIG. 2 is a combined circuit schematic and sketch of the mechanical elements of the improved thermostat structure.

Turning to FIG. 2 which diagrammatically shows the structure of the preferred embodiment, one should first note that there are a number of components which are similar in both FIG. 1 and in FIG. 2. In particular, temperature sensitive switches 19 and 29 are identical in each of these two figures, as is motor 10 and the air flow control apparatus. Anticipator resistors 25 and 35 in FIG. 2 may or may not be identical to the similarly numbered resistors in FIG. 1 but similar numbering is retained so as to emphasize the similarity in function of each. The improvement which this invention provides is to allow the values of resistors 25 and 35 to be chosen strictly on the basis of the temperature anticipation heat required rather than on considerations relating to characteristics of motor 10 or the number of such motors as well. It should be noted that the physical placement of anticipation resistors 25 and 35 with respect to bimetal strip 24 will typically be identical in each of these two thermostats. In view of these substantial similarities, it is believed there is no need to repeat discussion of these identical elements when explaining and describing FIG. 2.

Figure 3:
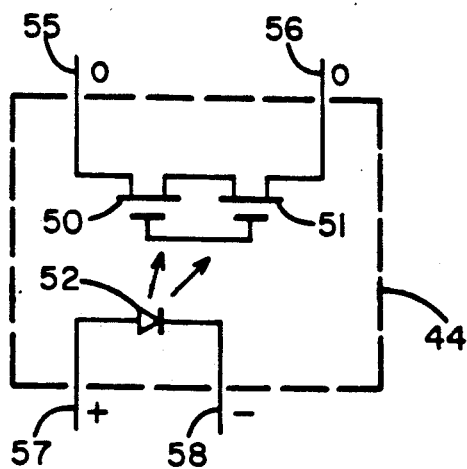
FIG. 3 is a simplified circuit representation of a relay preferred for use in FIG. 2.
Figure 4:
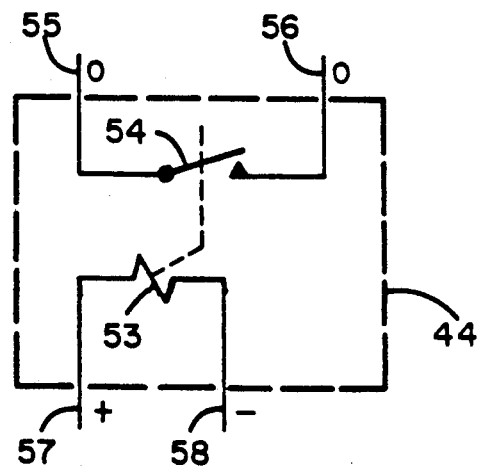
FIG. 4 is a symbolic diagram of the electromagnetic analog of the relay of FIG. 3.

Turning next to the improvements shown in FIG. 2, current for anticipation resistor 35 is controlled by a relay 45 whose pair of contacts (each labeled "O" for "output") forms a first series anticipator circuit with anticipator resistor 25. The contact pair of relay 44 forms a second series anticipator circuit with anticipator resistor 35. Relays 44 and 45 are of the type shown in FIG. 3. One commercial relay which is suitable is that available from AT&T Microelectronics, Allentown, PA 18103 designated Model No. LH1191AT and described in the AT&T publication DS88-113LBC dated July, 1988. Each of the relays 44 and 45 include a light emitting diode 52 which when producing light reduces the impedance of semiconductor elements 50 and 51 causing them to conduct bidirectionally between terminals 55 and 56. FIG. 4 symbolically shows the electromagnetic analog of this solid state relay with its contact pair connecting terminals 55 and 56. Thus in FIG. 2 terminal 56 of relay 44 as shown in FIG. 3 may be connected to a terminal of resistor 25 and terminal 55 may be connected to terminal 36 as shown. Similarly, terminal 56 of relay 45 may be connected to a terminal of resistor 35 and terminal 55 may be connected to winding 12.

Conduction occurs between the "O" terminals when a direct current closure signal is applied to the control terminals 57 and 58 of the relay as shown in FIG. 3. The "+" and "−" designations indicate the proper polarity for the control signal at the control terminals for the relays in FIGS. 2, 3, and 4. While two single pole relays are shown in FIG. 2, it is possible in this invention to use a single relay package having two independent contact pairs controlled by the same LED or other activating element. The one and two package versions should be considered to be identical as far as this invention is concerned. The use of these solid state relays is preferred because their small size allows them to be included within a thermostat package of customary size, something probably not possible if electromagnetic relays were to be used.

The closure signal for closing the contact pair of each of relays 44 and 45 in FIG. 2 is applied across a series circuit comprising the control terminal pair of each of these relays. The closure signal is provided by a switch condition sensor circuit which in this embodiment comprises a rectifier diode 40 connected in series with a current limiting resistor 43 to form a series sensor circuit which is connected between contact 22 of temperature responsive switch 19 and the + control terminal of relay 44. The − control terminal of relay 44 is connected to the + terminal of relay 45 and the − terminal of relay 45 is connected to contact 23 of switch 19 to complete with the series sensor circuit, a series control circuit.

Since this thermostat receives alternating current at power terminals 36 and 37, it is further necessary to provide a capacitor 41 to assure a sufficient DC voltage on the relays' control terminals throughout each AC cycle to keep each relay's output terminals conductive. Capacitor 41 is connected from the cathode of diode 40 to terminal 23 of switch 19. Diode 40 and capacitor 41 form a series rectifier circuit which is connected across the contacts 22 and 23 of switch 19. To prevent damage to the light emitting diodes in relays 44 and 45 by reverse voltage across them, a protective diode 42 which diverts such voltage is placed between the − terminal of relay 45 and the + terminal of relay 44.

The first series anticipator circuit formed by the contact pair ("O" terminals) of relay 45 and anticipation resistor 35 is connected in parallel with (across) the control terminal of relay 44, and the connection of the negative control terminal of relay 45 to switch contact 23 activates both relays 44 and 45 with current flowing through winding 11, causing the contact pairs within them to conduct. Accordingly, current flows through anticipator resistor 25 causing the designed-for anticipator heat to be applied to bimetal strip 24. Although the contact pair of relay 45 is closed, since switch 29 is not conducting, no current flows in resistor 35.

When the temperature of enclosure 18 drifts outside of the control range one or the other of these switches will close. Consider first the situation where enclosure temperature increases. Eventually the second selectable temperature is reached and the end of arm 26 drops allowing mercury globule 21 to roll to the right to connect contacts 22 and 23. With contacts 22 and 23 connected, the closure signal for relays 44 and 45 vanishes, both relays 44 and 45 open, and current flow through anticipation resistor 25 ceases. Further, with conduction between reverse motor winding 12. Power flow both to winding 12 and to the first series anticipator circuit is thus controlled by the contact pair 32 and 33 of temperature responsive switch 29. The second series anticipator circuit formed by the contact pair of relay 44 and anticipation resistor 25 is connected directly across the power terminals 36 and 37.

During operation of the temperature control system of FIG. 2 for enclosure 18, as in FIG. 1 cooling air is constantly supplied to the intake of duct 17. Most often, damper 16 will be partially opened so that (in air conditioning mode) heat removed from enclosure 18 by air flowing in duct 17 will balance the heat entering and leaving enclosure 18 through walls, from occupants, etc. The interior air temperature will be maintained within the first and second selectable temperatures defining the control range and which are established by the switches 19 and 29 and the selectable angle at which each opens and closes under the influence of the ambient temperature of strip 24 and the setting of shaft 28. In the position shown in FIG. 2 with switch 19 open, no electrical contact exists between terminals 22 and 23 and essentially the full AC voltage of terminals 36 and 37 is present across these terminals. With switch 19 open, the switch condition sensor circuit (which comprises diode 40, capacitor 41 and resistor 43) places a DC voltage potential on the positive contacts 22 and 23, current flows to the forward winding 11 of motor 10 causing shaft 15 to rotate in a clockwise direction opening damper 16. Partly because of the increased flow of cooling air into enclosure 18 but more predominantly because of the absence of anticipation heat from resistor 25, bimetal strip 24 soon begins to unwind causing capsule 20 to tilt upwardly causing mercury ball 21 to roll to the left, disconnecting contacts 22 and 23 from each other. When this happens then current flow to winding 11 ceases and relay 44 (and relay 45) again closes causing anticipator resistor 25 to begin again to apply heat to bimetal strip 24. If the amount of anticipation heat applied by resistor 25 is properly matched with the air flow rate, air temperature, and motor shaft speed, then damper 16 will have been positioned for a flow rate of cooling air that will very closely match the heat input to the enclosure, to thereby maintain enclosure temperature without the need for further damper 16 adjustment for a long period of time.

If at some later time enclosure 18 cools to below the first selectable temperature then bimetal strip 24 unwinds, rotating arm 26 counterclockwise so that mercury globule 31 rolls to the left and electrically connects contact 32 and contact 33. Current flows between these contacts and through reverse motor winding 12. At the same time current flows through anticipation resistor 35 by virtue of the fact that switch 29 is closed and the contact pair of relay 45 is closed, applying additional anticipation heat to bimetal strip 24. This additional heat cooperates with and indeed predominates over the reduced flow of cooling air resulting from the closing of damper 16 caused by the counterclockwise rotation of shaft 15, to raise the ambient temperature for bimetal strip 24 and to rotate arm 26 clockwise. This causes mercury globule 31 to roll to the right and electrical connection between contact 32 and 33 ceases. Breaking the connection between contacts 32 and 33 stops current flow both through motor winding 12 and through anticipation resistor 35. The resistor 35 should be sized to provide sufficient anticipation heat while switch 29 is closed to cause bimetal strip 24 to warm more rapidly than does enclosure 18 and switch 29 to open when enclosure temperature is within the control range. The same considerations discussed above respecting closing of switch 19 apply here too.

Because the control terminals of relays 44 and 45 having a preferred design draw only a very small amount of current (2.5 ma. for the LH1191AT described above) there is no slipping of shaft 15 when an unbalanced torque is applied to shaft 15. Accordingly, shaft 15 rotation is reduced to an absolute minimum which reduces wear on motor 10 and at the same time improves control of the temperature within enclosure 18. The anticipation current in resistor 25 which flows through winding 11 in FIG. does not flow through winding 11 in the circuit of FIG. 2 and oppose the drive current in winding 12 when switch 29 is closed. Thus, full torque is available from motor 10 in both directions. Since anticipation current flow is through neither motor winding, anticipation heat is independent of the number of motors attached to thermostat 9, and no adjustment to conform thermostat 9 to the installation is necessary. It can also be seen that the values for resistors 25 and 35 can be chosen without considering the effect on motor 10 performance which a particular value for either may have.

Having thus described my invention, what I wish to protect by Letters Patent is:

1. In a thermostat of the type to be placed in an enclosure for controlling the position of a reversible motor's shaft controlling in turn the temperature of the enclosure, said thermostat for connecting one of a forward drive coil and a reverse drive coil of the motor to a source of electric power in response to changes in the enclosure temperature, said thermostat having a temperature responsive element including a first switch conducting when ambient temperature is below a first selectable temperature, said first switch for series connection with the reverse drive coil to form therewith a first series motor circuit, said temperature responsive element further including a second switch conducting whenever the ambient temperature is above a second selectable value, said second switch for series connection with the forward drive coil to form therewith a second series motor circuit, said series motor circuits for connection across power terminals of the source of electric power, said thermostat further including i) a first anticipator resistor connected to conduct current whenever the first switch is closed and positioned with respect to the temperature responsive element to apply heat thereto when conducting current, and ii) a second anticipator resistor connected to conduct current whenever the second switch is open and positioned with respect to the temperature responsive element to apply heat thereto when conducting, wherein the improvement comprises a) a switch condition sensor circuit sensing the condition of the second switch and providing a closure signal when the second switch is open; and b) a relay having an activating element receiving the closure signal from the switch position sensor and having a first and a second pair of normally open contacts, said pairs of relay contacts closing responsive to the closure signal, said first pair of relay contacts in series connection with the first resistor to form a first series anticipator circuit for connection across the reverse motor winding and said second pair of relay contacts in series connection with the second resistor to form a second series anticipator circuit for connection across the power terminals of the source of electric power.

2. The thermostat of claim 1, wherein the switch condition sensor circuit is connected to a contact of the second switch.

3. The thermostat of claim 2, wherein the switch condition sensor circuit comprises a rectifying diode and a resistor in series connection to form a series sensor circuit connected to the activating element.

4. The thermostat of claim 3, wherein the relay comprises a solid state relay having optically activated contact pairs, and having an activating element causing conduction between the contact pairs, said activating element comprising a light emitting diode.

5. The thermostat of claim 4, wherein the switch condition sensor circuit further comprises a capacitor forming a series rectifier circuit with the rectifier diode, said series rectifier circuit being connected across the contacts of the second switch.

6. The thermostat of claim 3, wherein the relay comprises a solid state relay having optically activated contact pairs, and wherein the activating element comprises a light emitting diode activating the contact pairs responsive to a voltage across the light emitting diode terminals.

7. The thermostat of claim 6, wherein the light emitting diode is in series connection with the series sensor circuit to form a series control circuit, said series control circuit being connected across the second switch.

8. The thermostat of claim 7, further including a capacitor in series connection with the rectifier diode to form a series rectifier circuit, said series rectifier circuit being connected across the second switch.

9. The thermostat of claim 1, wherein the relay comprises first and second relays, each having an activating element receiving the closure signal and the first relay having the first pair of normally open contacts and the second relay having the second pair of normally open contacts.

* * * * *